(12) United States Patent
Kingsley

(10) Patent No.: US 6,721,541 B1
(45) Date of Patent: Apr. 13, 2004

(54) WIRELESS TELEPHONE TESTING USING AN ECHO PLUG

(75) Inventor: Paul Michael Kingsley, Monument, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/550,973

(22) Filed: Apr. 17, 2000

(51) Int. Cl.[7] .................................................. H04Q 7/20
(52) U.S. Cl. ................. 455/67.11; 455/423; 455/226.1; 379/22.01; 379/27.03
(58) Field of Search ................................ 455/423, 424, 455/67.11, 67.4, 67.5, 67.7, 226.1, 226.4, 347; 379/22.01, 22.02, 27.01, 27.02, 27.03

(56) References Cited

U.S. PATENT DOCUMENTS

| | | | |
|---|---|---|---|
| 5,023,900 A | * 6/1991 | Tayloe et al. | 455/522 |
| 5,784,406 A | * 7/1998 | DeJaco et al. | 455/69 |
| 5,790,657 A | * 8/1998 | Fujiwara | 370/342 |
| 5,898,921 A | * 4/1999 | Liinamaa et al. | 455/63 |
| 5,943,617 A | * 8/1999 | Nakamura | 455/456 |
| 5,977,747 A | * 11/1999 | Huang | 455/436 |
| 6,169,896 B1 | * 1/2001 | Sant et al. | 455/69 |
| 6,184,692 B1 | * 2/2001 | Jindal | 455/456 |
| 6,253,060 B1 | * 6/2001 | Komara et al. | 455/456 |
| 6,308,074 B1 | * 10/2001 | Chandra et al. | 455/456 |
| 6,353,313 B1 | * 3/2002 | Estep et al. | 455/69 |
| 6,370,366 B2 | * 4/2002 | Roullet | 342/464 |

* cited by examiner

*Primary Examiner*—William Trost
*Assistant Examiner*—James Ewart

(57) ABSTRACT

An echo plug is plugged into a hands-free jack of a wireless telephone for testing purposes. A test signal is transmitted from a test system to the wireless telephone over a test call. In the echo plug, the test signal is looped back from a speaker connection to a microphone connection of the hands-free jack. The test signal is transmitted from the wireless telephone to the test system over the test call. In other embodiments, an echo plug is used to loop a test signal from a speaker connection of a first wireless telephone to a microphone connection of a second wireless telephone.

29 Claims, 10 Drawing Sheets

WIRELESS TELEPHONE TESTING USING AN ECHO PLUG

BACKGROUND OF THE INVENTION

1. Field of the Invention

The invention is related to the field of wireless communications, and in particular, to methods for using an echo plug that plugs into the hands-free jack of a wireless telephone to test wireless telephones and communication systems.

2. Background of the Invention

The demand for wireless communication services is growing dramatically, and there is corresponding growth in the need to test wireless telephones and communication systems. A common testing technique uses a test system that is equipped with a transmit telephone circuit and a receive telephone circuit. The transmit telephone circuit places a test call to the receive telephone circuit over a wireless telephone. The transmit telephone circuit then transmits test signals over the call connection to the receive telephone circuitry. The test system compares the received test signals to the transmitted test signals to generate statistics regarding voice quality and round-trip delay. One example of a test system is the Voice Quality Tester supplied by Agilent Technologies. Two common voice quality measurements are Perceptual Speech Quality Measure (PSQM) and Perceptual Analysis Measurement System (PAMS).

The above-described test call is placed as follows. The transmit telephone circuit is connected to a wireless telephone using a special connector that is customized for the wireless telephone. The receive telephone circuit is connected to a telephone jack that is coupled to the communication network. The wireless telephone places a test call using a test telephone number. A wireless transceiver in the communication system handles the test call from the wireless telephone, and the communication system routes the call to the telephone jack. The receive telephone circuit that is connected to the telephone jack answers the call. The test system is now connected to a communications loop through the communication network and is ready to conduct voice quality and delay tests.

Wireless telephone suppliers and service providers need to test their equipment under various conditions to ensure quality. Unfortunately, the above-described testing technique inhibits robust testing under dynamic test conditions. For example, the test system is coupled to the wireless telephone with a special connector that is not compatible with other types of wireless telephones. Many wireless telephones do not have their own special connectors, and even if they did, the use of many different special connectors is cumbersome. As a result, the test system cannot effectively test many different types of wireless telephones. In addition to this restriction, mobility testing is cumbersome because the test system must be moved along with the wireless telephone.

The public telephone network internally performs similar tests. On a percentage of calls, the originating telephone switch requests a continuity test in the call set-up signaling message. In response to the request, the terminating telephone switch cross-connects the connections for the call. The originating telephone switch then transmits a tone to the terminating telephone switch where the tone is looped back to the originating telephone switch. The continuity test is successful if the originating telephone switch receives the tone. Continuity testing is inadequate to test wireless telephones and communication systems.

SUMMARY OF THE INVENTION

The invention solves the above problem with methods for testing wireless telephones and communication systems under dynamic test conditions. An echo plug is used to loop test signals through a wireless telephone and back to a test system. The echo plug fits into the hands-free jack of a wireless telephone and is easily moved from one wireless telephone to another. The wireless telephones retain their mobility with the echo plug attached. The echo plug facilitates the testing of different wireless telephones at various locations over different communication systems.

In one method, an echo plug is plugged into a hands-free jack of a wireless telephone. A test call is generated between the test system and the wireless telephone. The test system transmits a test signal to the wireless telephone over the test call. The echo plug loops the test signal from a speaker connection of the hands-free jack to a microphone connection of the hands-free jack. The wireless telephone transmits the test signal to the test system over the test call. The test system generates test results in response to the test signal.

In another method, the echo plug is plugged into hands-free jacks of two wireless telephones. Two test calls are generated between the test system and the two wireless telephones. The test system transmits a test signal to the first wireless telephone over the first test call. The echo plug loops the test signal from a speaker connection of the hands-free jack in the first wireless telephone to a microphone connection of the hands-free jack in the second wireless telephone. The second wireless telephone transmits the test signal to the test system over the second test call. The test system generates test results in response to the test signal.

DETAILED DESCRIPTION OF THE INVENTION

Figure 1:
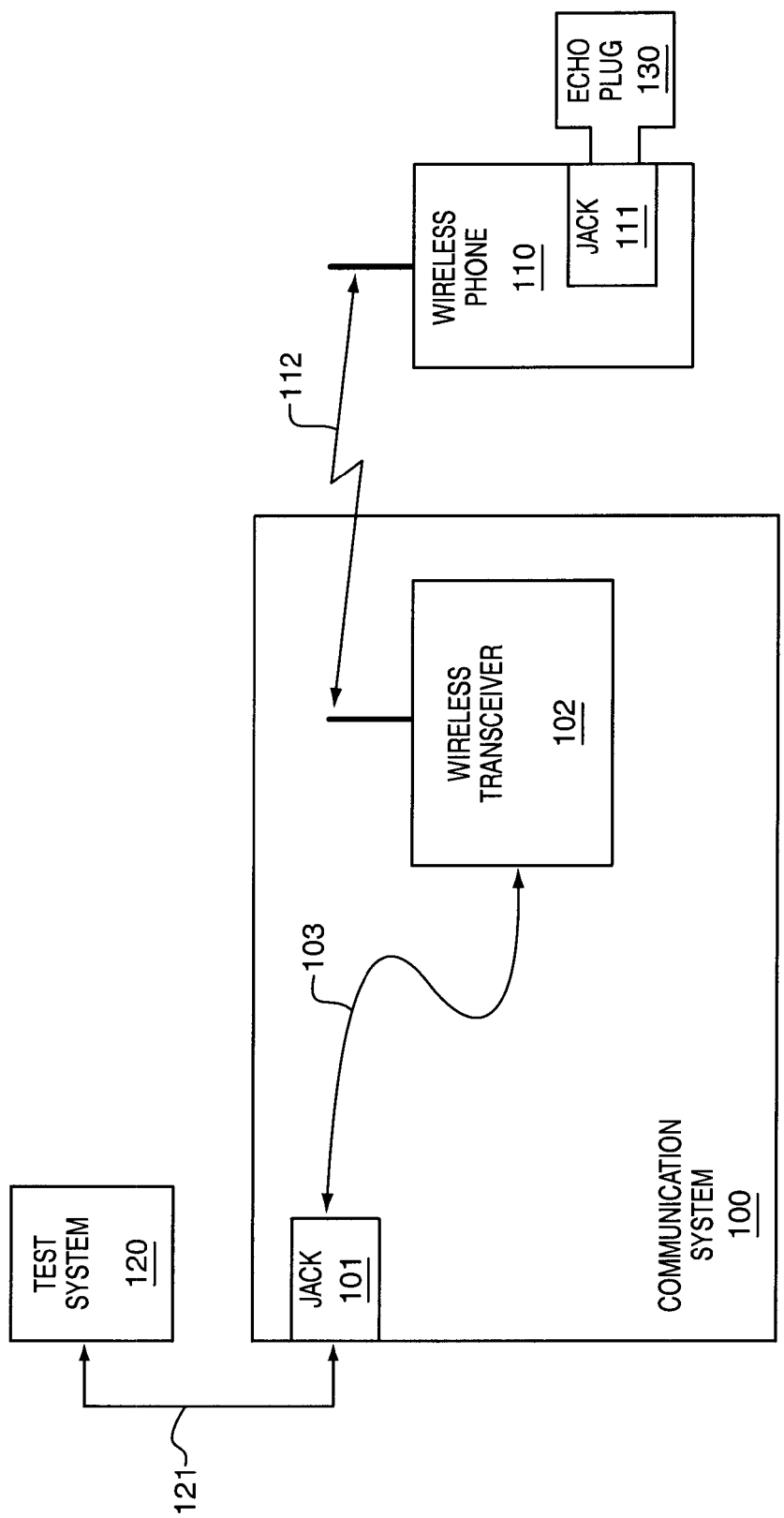
FIG. 1 is a block diagram that illustrates system configuration in an example of the invention.

System Configuration—FIG. 1

FIG. 1 is a block diagram that illustrates system configuration in an example of the invention. The system includes communication system 100, wireless telephone 110, and test system 120. Communication system 100 comprises jack 101 coupled to wireless transceiver 102 by communications path 103. Communications path 103 could include multiple communication devices that are omitted for clarity. Wireless telephone 110 comprises hands-free jack 111 and communicates with wireless transceiver 102 over wireless link 112. Hands-free jack 111 is configured with speaker and microphone connections that allow the connection of headsets and other audio devices to wireless telephone 110. The speaker connection is sometimes referred to as "audio out", and the microphone connection is sometimes referred to as "audio in". Test system 120 is connected to jack 101 by telephone cable 121. The above components could be conventional.

The system also includes echo plug 130 that is plugged into hands-free jack 111. Echo plug 130 has a pin and pin handle that can be the similar to those of conventional hands-free plugs. Echo plug 130 is physically compatible with hands-free jack 111 of wireless telephone 110. Echo plug 130 is configured with a speaker connection and a microphone connection that couple to their respective connections of hands-free jack 111. Echo plug 130 also has a circuit that is configured to couple the speaker connection to the microphone connection. Thus, echo plug 130 loops the "audio out" of wireless telephone 110 back to the "audio in". Advantageously, echo plug 130 facilitates testing by looping test signals back to test system 120.

Figure 2:
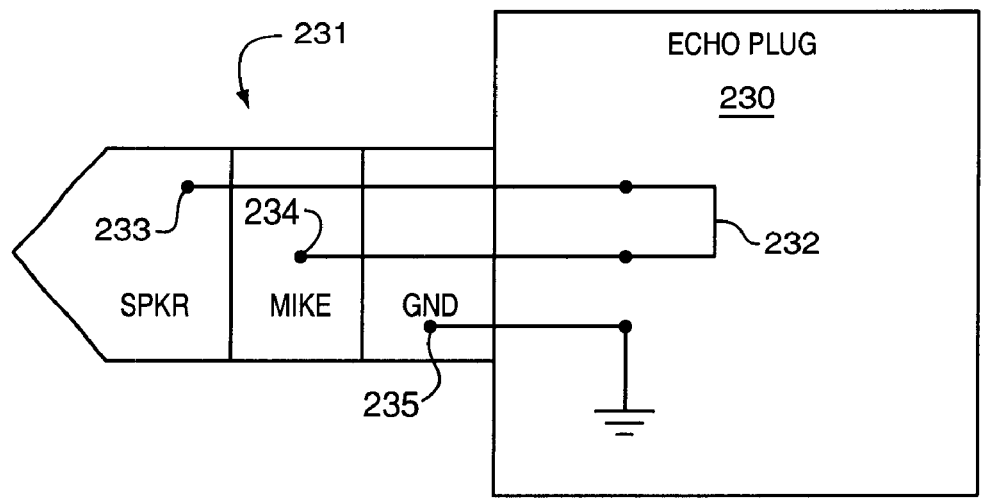
FIG. 2 is a schematic diagram that illustrates an echo plug in an example of the invention.
Figure 3:
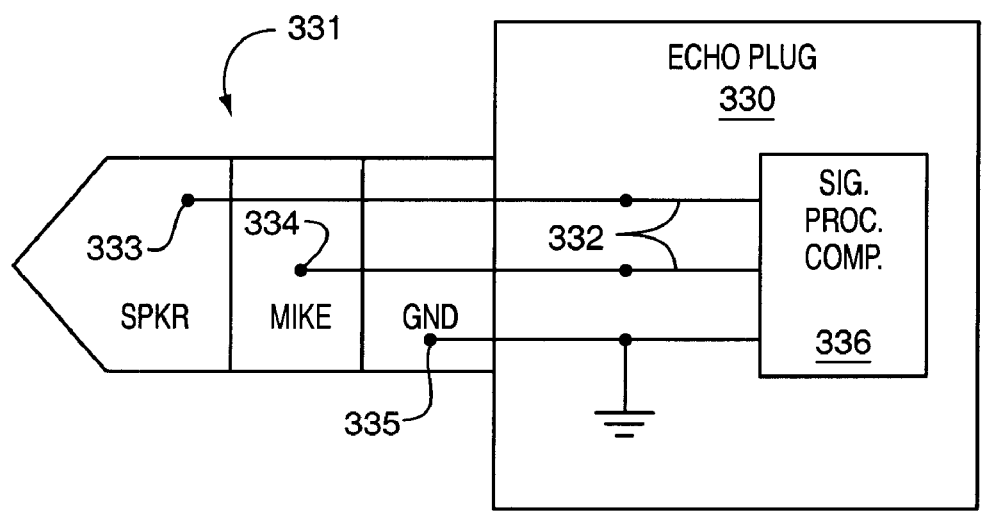
FIG. 3 is a schematic diagram that illustrates an echo plug with signal processing in an example of the invention.
Figure 4:
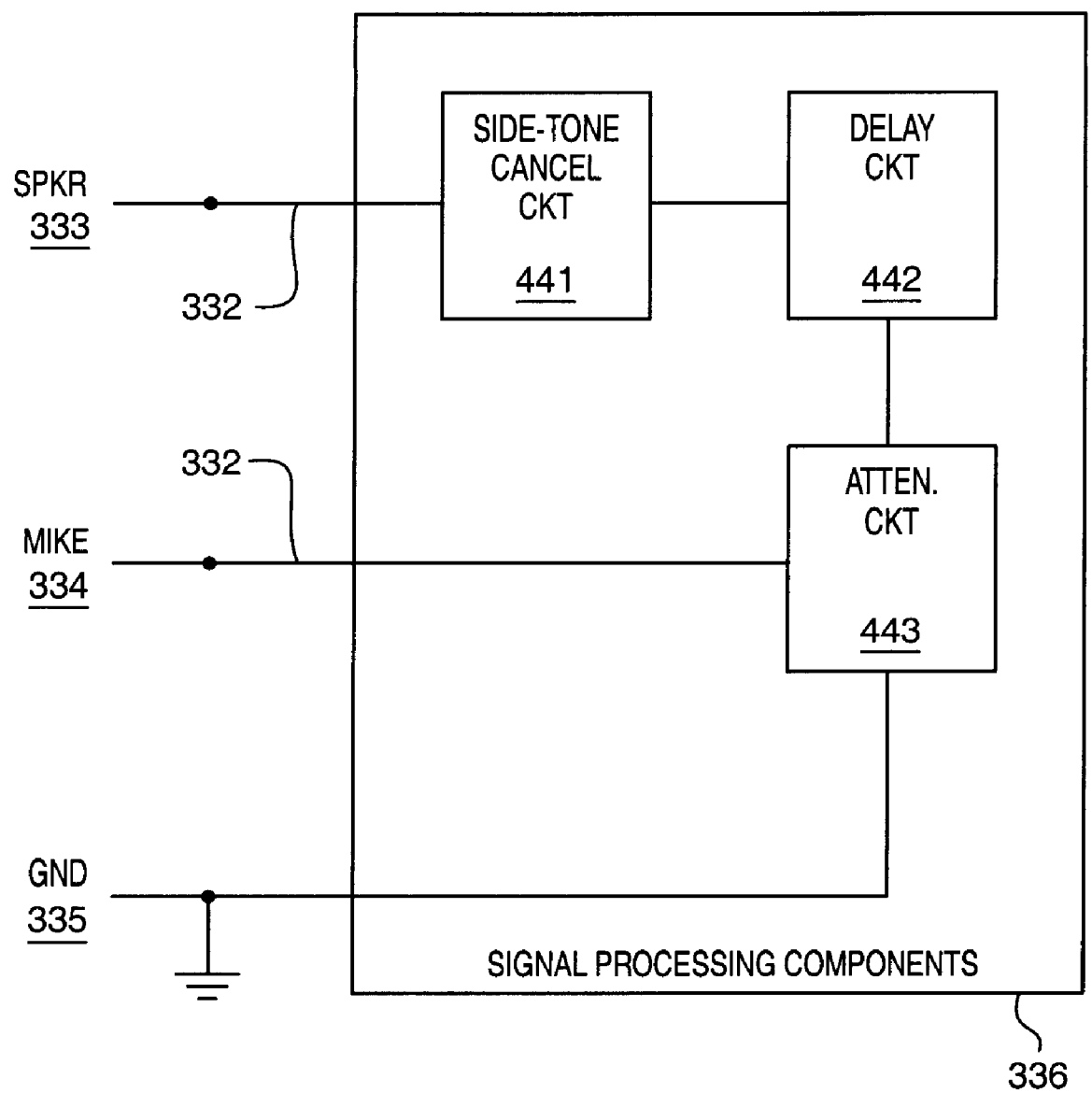
FIG. 4 is a schematic diagram that illustrates signal processing components in an example of the invention.

Echo Plug Configurations FIGS. 2–4

FIGS. 2–4 depict specific examples of echo plugs in accord with the present invention. Those skilled in the art will appreciate variations from these example that do not depart from the scope of the invention. Those skilled in the art will also appreciate that various features described below could be combined to form multiple variations of the invention.

FIG. 2 is a schematic diagram that illustrates an echo plug in an example of the invention. Echo plug 230 comprises pin 231 and circuit 232. Pin 231 is physically compatible with a 2.5 mm hands-free jack of a wireless telephone, although other sizes are used in other examples of the invention. Pin 231 has speaker connection 233, microphone connection 234, and ground connection 235. Circuit 232 couples speaker connection 233 to microphone connection 234. When echo plug 230 is plugged into the hands-free jack of a wireless telephone, signals that are sent to speaker connection 233 are looped back to microphone connection 234.

FIG. 3 is a schematic diagram that illustrates an echo plug with signal processing components in an example of the invention. Echo plug 330 comprises pin 331 and circuit 332. Pin 331 is physically compatible with a 2.5 mm hands-free jack of a wireless telephone, although other sizes are used in other examples of the invention. Pin 331 has speaker connection 333, microphone connection 334, and ground connection 335. Circuit 332 couples speaker connection 333 to microphone connection 334 and includes signal processing components 336. When echo plug 330 is plugged into the hands-free jack of a wireless telephone, signals that are sent to speaker connection 333 are transferred through signal processing components 336 and looped back to microphone connection 334.

FIG. 4 is a schematic diagram that illustrates signal processing components 336 in an example of the invention. Signal processing components 336 comprise side-tone cancellation circuit 441, delay circuit 442, and attenuation circuit 443 coupled in series within circuit 332. The order of circuits 441–443 within circuit 332 can vary.

In the typical telephone, side-tones are voice signals from the microphone that are fed back to the speaker so the caller can hear what they are saying. Side-tone cancellation circuitry is commonly employed in speaker phones to eliminate side tones. Side-tone cancellation circuit 441 cancels side-tones in a similar fashion to avoid a potential feedback loop created by circuit 332 and side-tone connections in the wireless telephone.

In telephone networks, the voice signal echoes off of wiring equipment at the listener's site back to the speaker's site. The speaker hears this echo of their own voice if the distances between the callers is great enough. To remove the annoying echo, echo cancellers in the communication system subtract a copy of the signal that is transmitted in one direction from the signal that is transmitted in the other direction. The subtraction is timed to coincide with the time the annoying echo reaches the echo canceller. Echo cancellers adversely impact testing using echo plug 330 because they attempt to cancel the test signal intentionally looped back by circuit 332. Delay circuit 442 delays the test signal on circuit 332 past the time when echo cancellers remove echo. Thus, the echo cancellers remove ambient echo before the test signal from echo plug 330 reaches the echo canceller.

Some wireless telephones amplify the signals that are transferred to the speaker and that are received from the microphone. A test signal passing through echo plug 330 may be too powerful a signal for the microphone input. Attenuation circuit 443 reduces the strength of signals passing through echo plug 330 to offset any input level mismatch. One example of attenuation circuit 443 is a resister coupled between speaker connection 333 and microphone connection 334, and a capacitor coupled between microphone connection 334 and ground connection 335.

Figure 5:
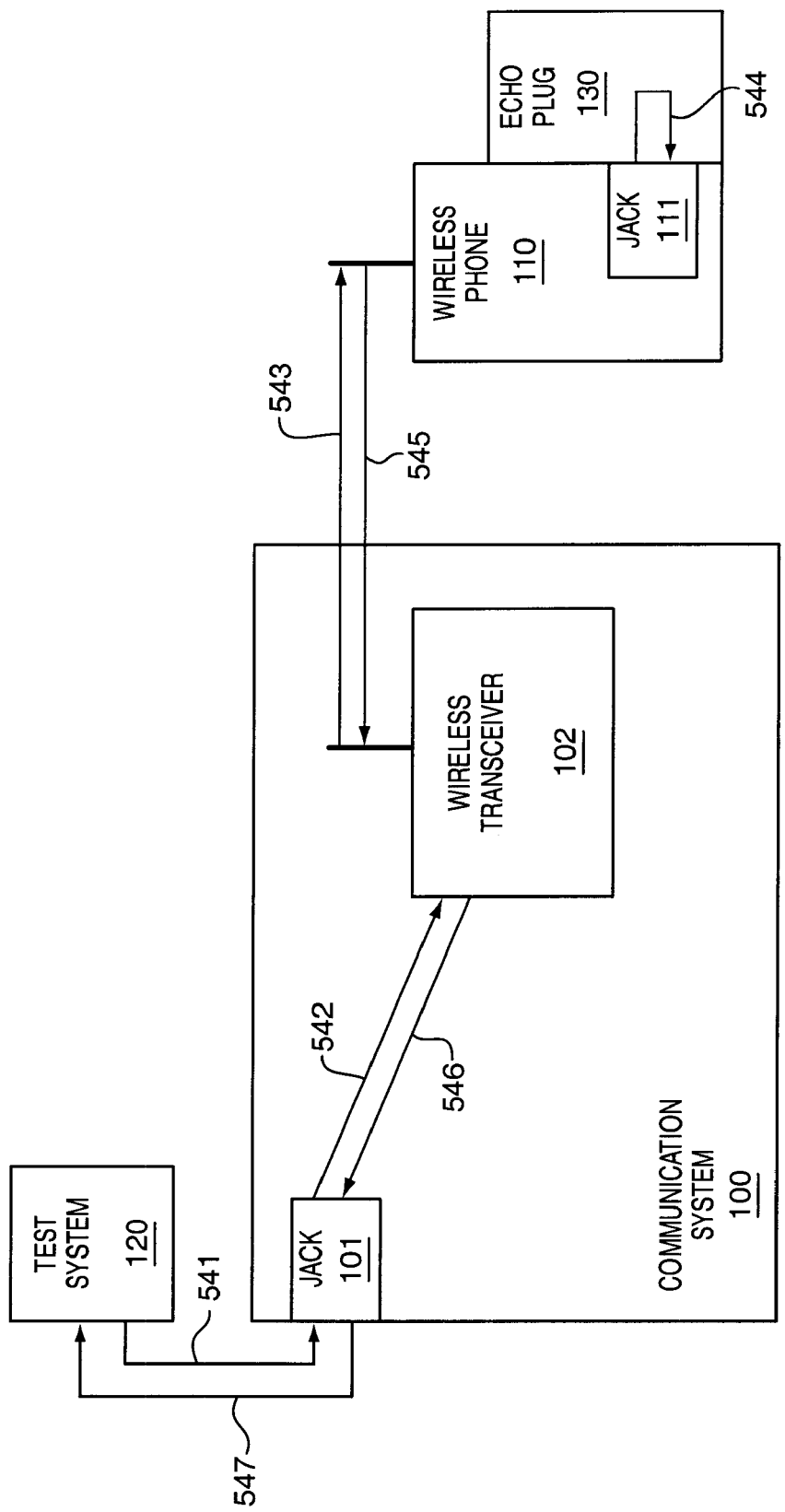
FIG. 5 is a block diagram that illustrates system operation in an example of the invention.

System Operation—FIG. 5

FIG. 5 is a block diagram that illustrates system operation in an example of the invention. The system is the same as depicted on FIG. 1 and includes communication system 100, wireless telephone 110, test system 120, and echo plug 130. Echo plug 130 is plugged into hands-free jack 111 of wireless telephone 110. A test call is generated between test system 120 and wireless telephone 110 through communication system 100. After the test call is answered, test system 120 transfers a test signal to the wireless telephone 110 over call paths 541, 542, and 543. Wireless telephone 110 transfers the test signal to the speaker connection of its hands-free jack 111. Echo plug 130 provides call path 544 to return the test signal to the microphone connection of hands-free jack 111. Echo plug 130 may apply side-tone cancellation, delay, and attenuation to the test signal on call path 544. The microphone connection of hands-free jack 111 transfers the test signal to the transmit circuitry of wireless telephone 110. Wireless telephone 110 transfers the test signal to test system 120 over call paths 545, 546, and 547. Test system 120 compares the received test signal to the transmitted test signal to generate statistics regarding voice quality and round-trip delay.

Figure 6:
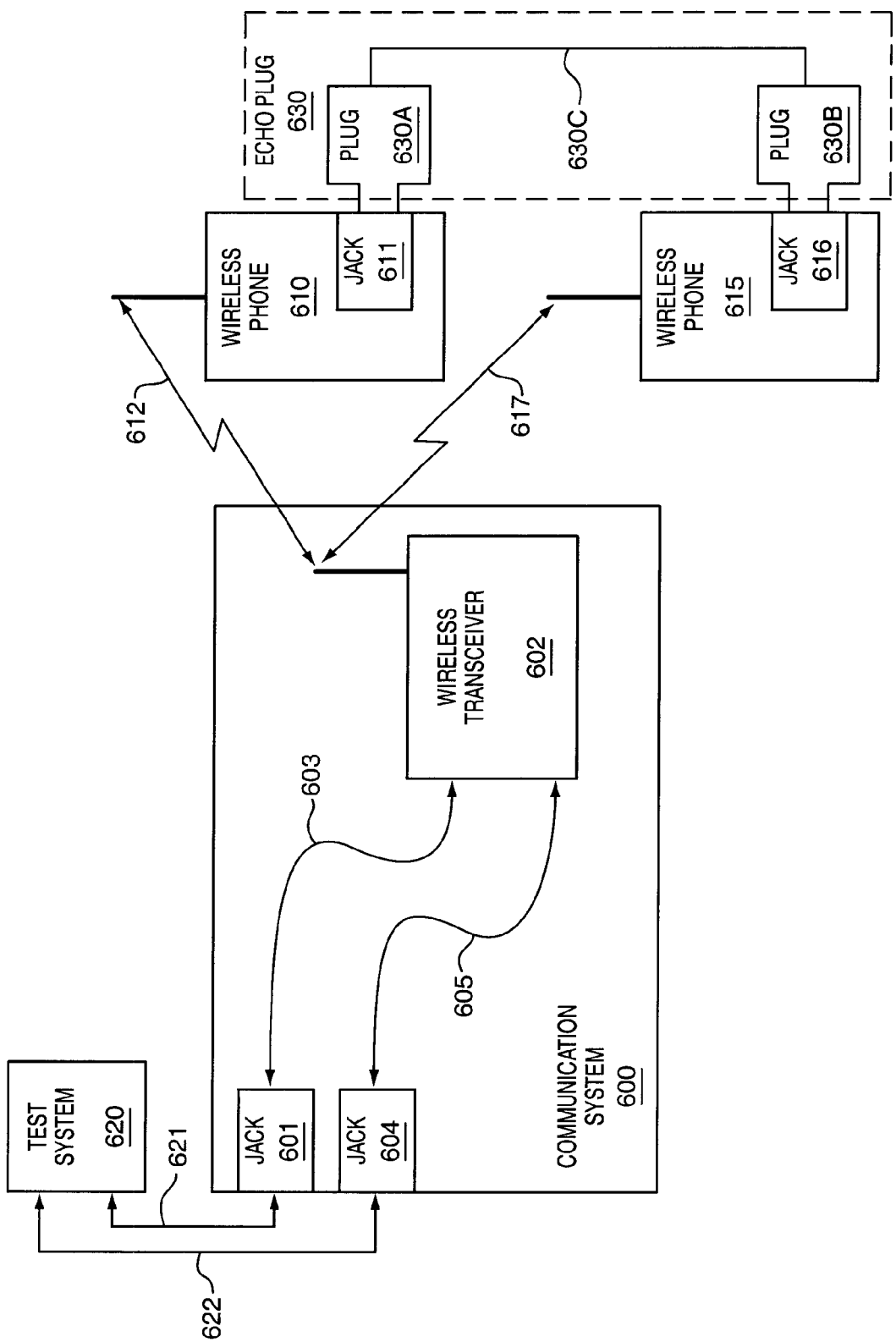
FIG. 6 is a block diagram that illustrates system configuration in an example of the invention.

Alternate System Configuration—FIG. 6

FIG. 6 is a block diagram that illustrates an alternate system configuration in an example of the invention. The system includes communication system 600, wireless telephone 610, wireless telephone 615, and test system 620. Communication system 600 comprises jacks 601 and 604 respectively coupled to wireless transceiver 602 by communications path 603 and 605. Communications paths 603 and 605 could include multiple communication devices that are omitted for clarity. Wireless telephones 610 and 615 respectively comprise hands-free jacks 611 and 616. Wireless telephones 610 and 615 respectively communicate with wireless transceiver 602 over wireless links 612 and 617, although they could communicate with separate transceivers in other examples of the invention. Hands-free jacks 611 and 616 are each configured with speaker and microphone connections. Test system 620 is respectively connected to jacks 601 and 604 by telephone cables 621 and 622. The above components could be conventional.

The system also includes echo plug 630 that comprises plugs 630A and 630B that are connected by cable 630C. Plug 630A is plugged into hands-free jack 611, and plug 630B is plugged into hands-free jack 616. Plugs 630A and 630B each have a pin and pin handle that can be the similar to those of conventional hands-free plugs. Plugs 630A and 630B are physically compatible with hands-free jacks 611 and 616. Plugs 630A and 630B are each configured with a speaker connection and a microphone connection that couple to their respective connections of hands-free jacks 611 and 616. Echo plug 630 has a circuit passing through cable 630C that is configured to couple the speaker connection of plug 630A to the microphone connection of plug 630B. Thus, echo plug 630 loops the "audio out" of wireless telephone 610 to the "audio in" of wireless telephone 615. Advantageously, echo plug 630 facilitates testing by looping test signals back to test system 620.

The use of separate wireless telephones 610 and 615 effectively eliminates the side-tone and echo cancellation problems described with respect to FIG. 4. There is no potential for an undesirable feedback loop between the echo plug 630 and side-tone circuitry in wireless telephones 610 or 615. There is no echo cancellation between the separate connections from test system 620 to wireless telephones 610 and 615.

Figure 7:
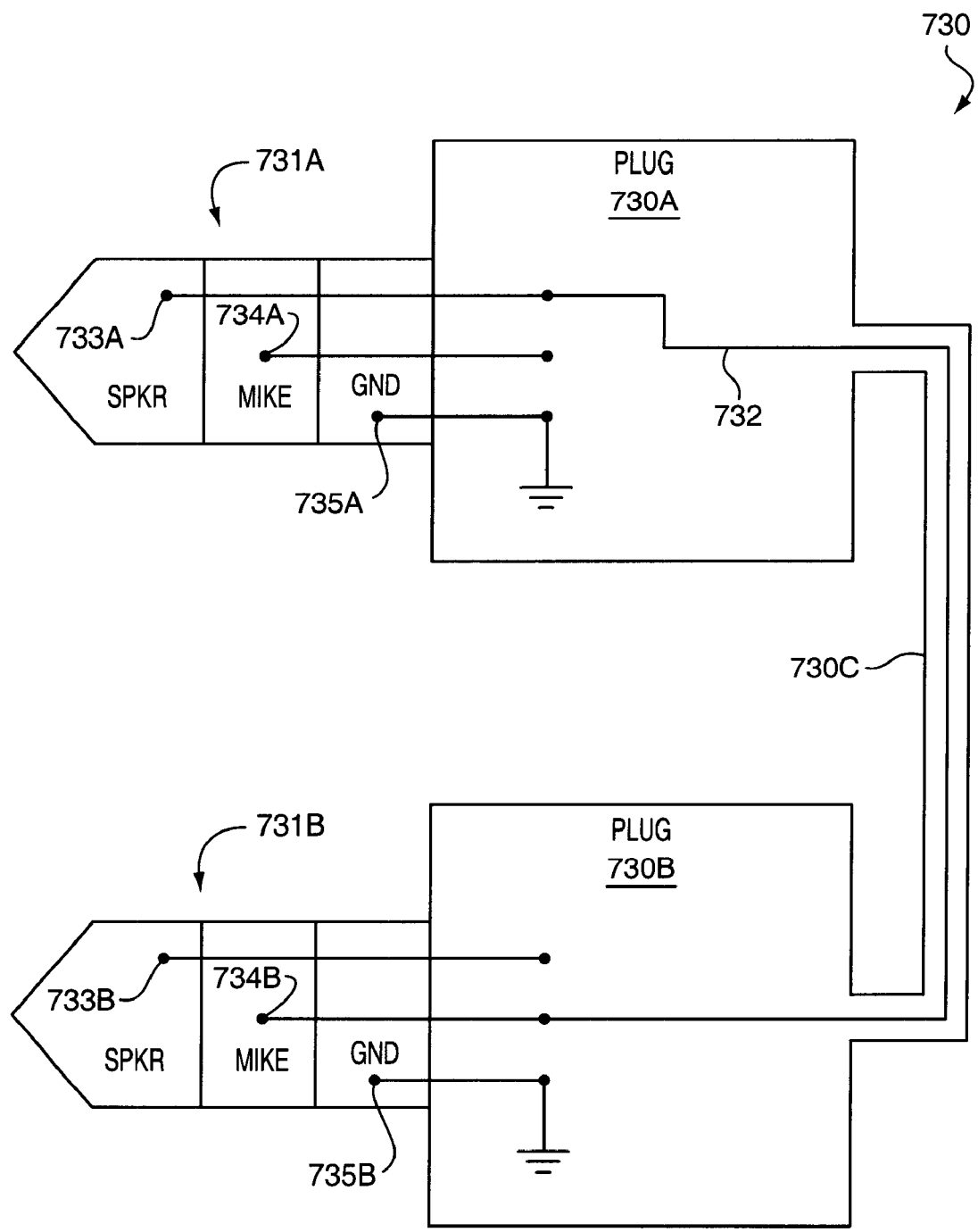
FIG. 7 is a schematic diagram that illustrates an echo plug in an example of the invention.
Figure 8:
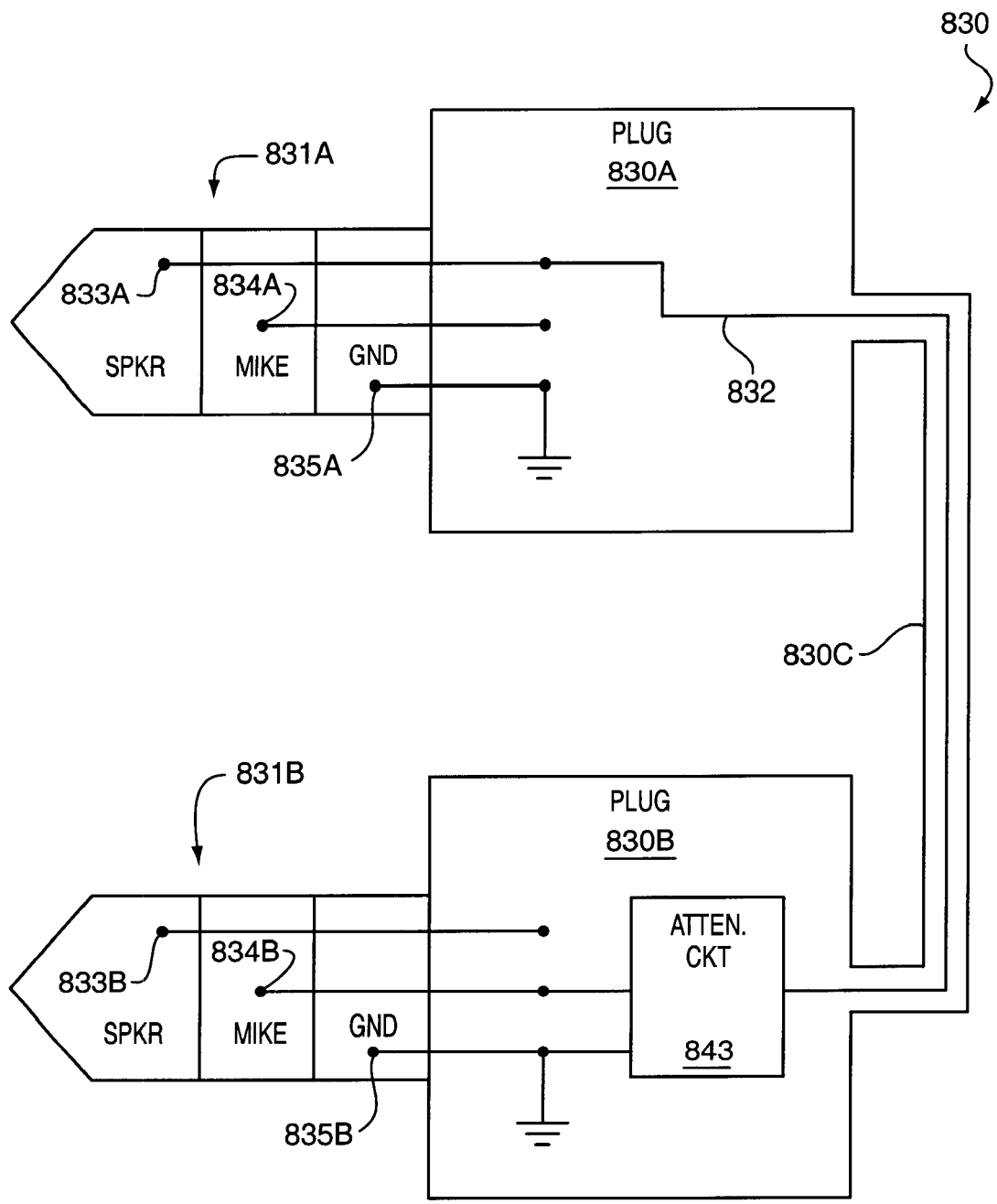
FIG. 8 is a schematic diagram that illustrates an echo plug with attenuation in an example of the invention.

Alternate Echo Plug Configurations FIGS. 7–8

FIGS. 7–8 depict specific examples of echo plugs in accord with the present invention. Those skilled in the art will appreciate variations from these example that do not depart from the scope of the invention. Those skilled in the art will also appreciate that various features described below could be combined to form multiple variations of the invention.

FIG. 7 is a schematic diagram that illustrates an echo plug in an example of the invention. Echo plug 730 comprises plug 730A coupled to plug 730B by cable 730C. Plugs 730A and 730B have respective pins 731A and 731B that are physically compatible with a 2.5 mm hands-free jack of a wireless telephone, although other sizes are used in other examples of the invention. Pin 731A has a speaker connection 733A, microphone connection 734A, and ground connection 735A. Pin 731B has a speaker connection 733B, microphone connection 734B, and ground connection 735B. Circuit 732 passes through cable 730C to couple speaker connection 733A to microphone connection 734B. When echo plug 730 is plugged into the hands-free jacks of two wireless telephones, signals that are sent to speaker connection 733A are looped back to microphone connection 734B.

FIG. 8 is a schematic diagram that illustrates an echo plug with attenuation in an example of the invention. Echo plug 830 comprises plug 830A coupled to plug 830B by cable 830C. Plugs 830A and 830B have respective pins 831A and 831B that are physically compatible with a 2.5 mm hands-free jack of a wireless telephone, although other sizes are used in other examples of the invention. Pin 831A has a speaker connection 833A, microphone connection 834A, and ground connection 835A. Pin 831B has a speaker connection 833B, microphone connection 834B, and ground connection 835B. Circuit 832 passes through cable 830C to couple speaker connection 833A to microphone connection 834B through attenuation circuit 843. When echo plug 830 is plugged into the hands-free jacks of two wireless telephones, signals that are sent to speaker connection 833A are passed through attenuation circuit 843 and looped back to microphone connection 834B.

Some wireless telephones amplify the signals that are transferred to the speaker and that are received from the microphone. A test signal passing through echo plug 830 may be too powerful a signal for the microphone input. Attenuation circuit 843 reduces the strength of signals passing through echo plug 830 to offset any input level mismatch. One example of attenuation circuit 843 is a resister coupled between circuit 832 from speaker connection 833A and microphone connection 834B, and a capacitor coupled between microphone connection 834B and ground connection 835B.

Figure 9:
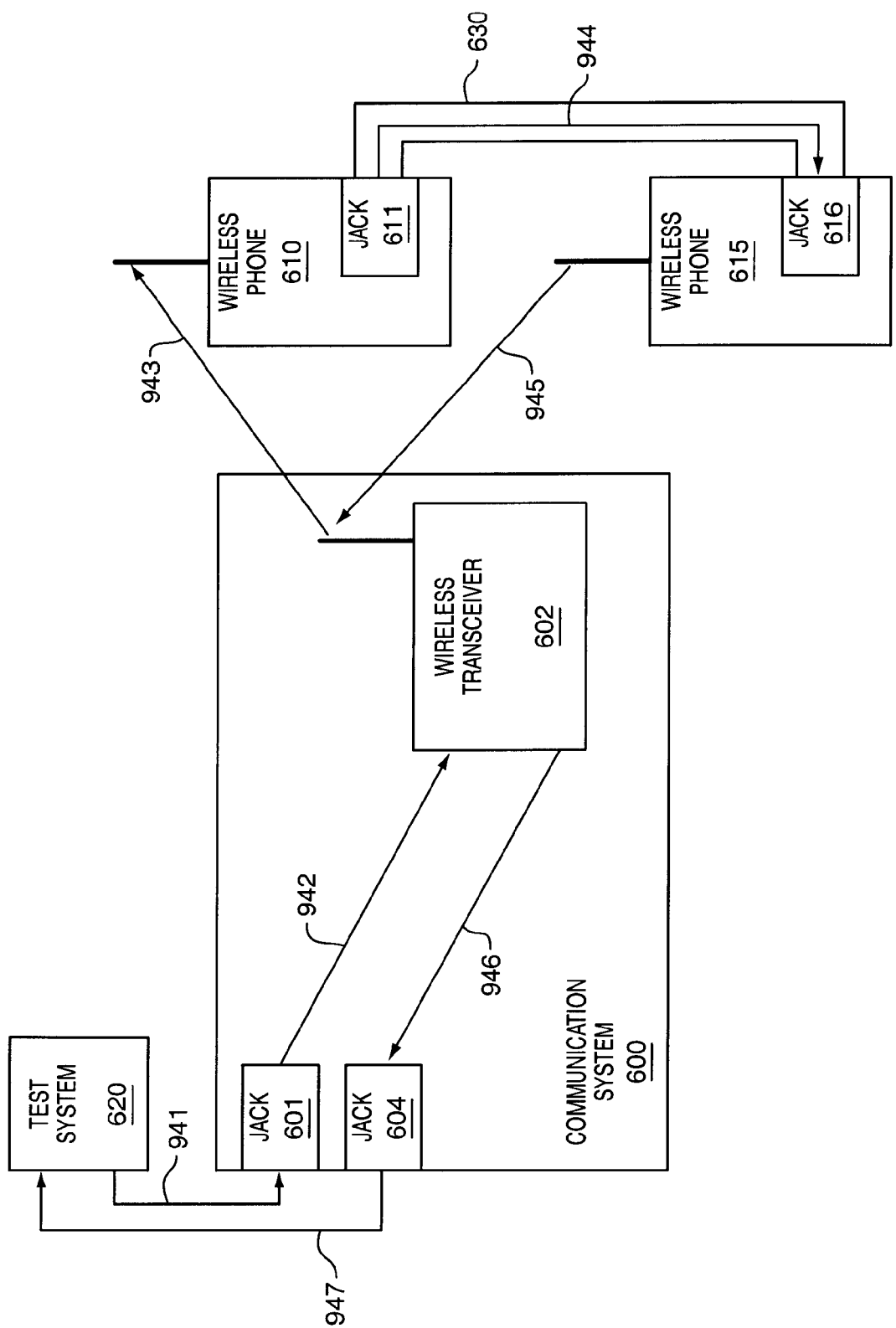
FIG. 9 is a block diagram that illustrates system operation in an example of the invention.

Alternate System Operation—FIG. 9

FIG. 9 is a block diagram that illustrates system operation in an example of the invention. The system is the same as depicted on FIG. 6 and includes communication system 600, wireless telephones 610 and 615, test system 620, and echo plug 630. Echo plug 630 is plugged into hands-free jacks 611 and 616 of respective wireless telephones 610 and 615. A first test call is generated through communication system 600 between test system 620 and wireless telephone 610. A second test call is generated through communication system 600 between test system 620 and wireless telephone 615. After the test calls are answered, test system 620 transfers a test signal to the wireless telephone 610 over call paths 941, 942, and 943. Wireless telephone 610 transfers the test signal to the speaker connection of hands-free jack 611. Echo plug 630 provides call path 944 to return the test signal to the microphone connection of hands-free jack 616. Echo plug 630 may apply attenuation to the test signal on call path 944. The microphone connection of hands-free jack 616 transfers the test signal to the transmit circuitry of wireless telephone 615. Wireless telephone 615 transfers the test signal to test system 620 over call paths 945, 946, and 947. Test system 620 compares the received test signal to the transmitted test signal to generate statistics regarding voice quality and round-trip delay.

Figure 10:
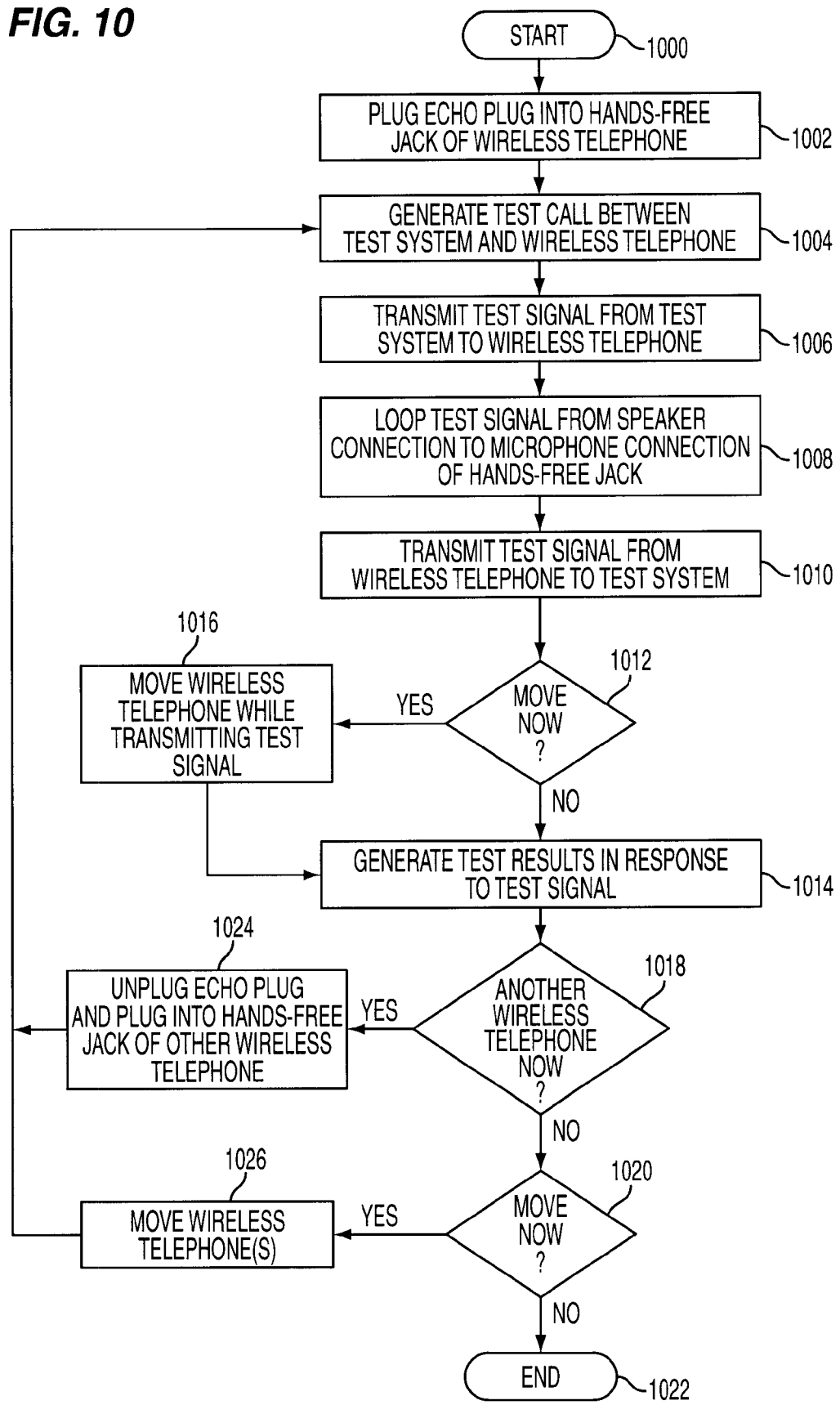
FIG. 10 is a flow diagram that illustrates a testing method in an example of the invention.
Figure 11:
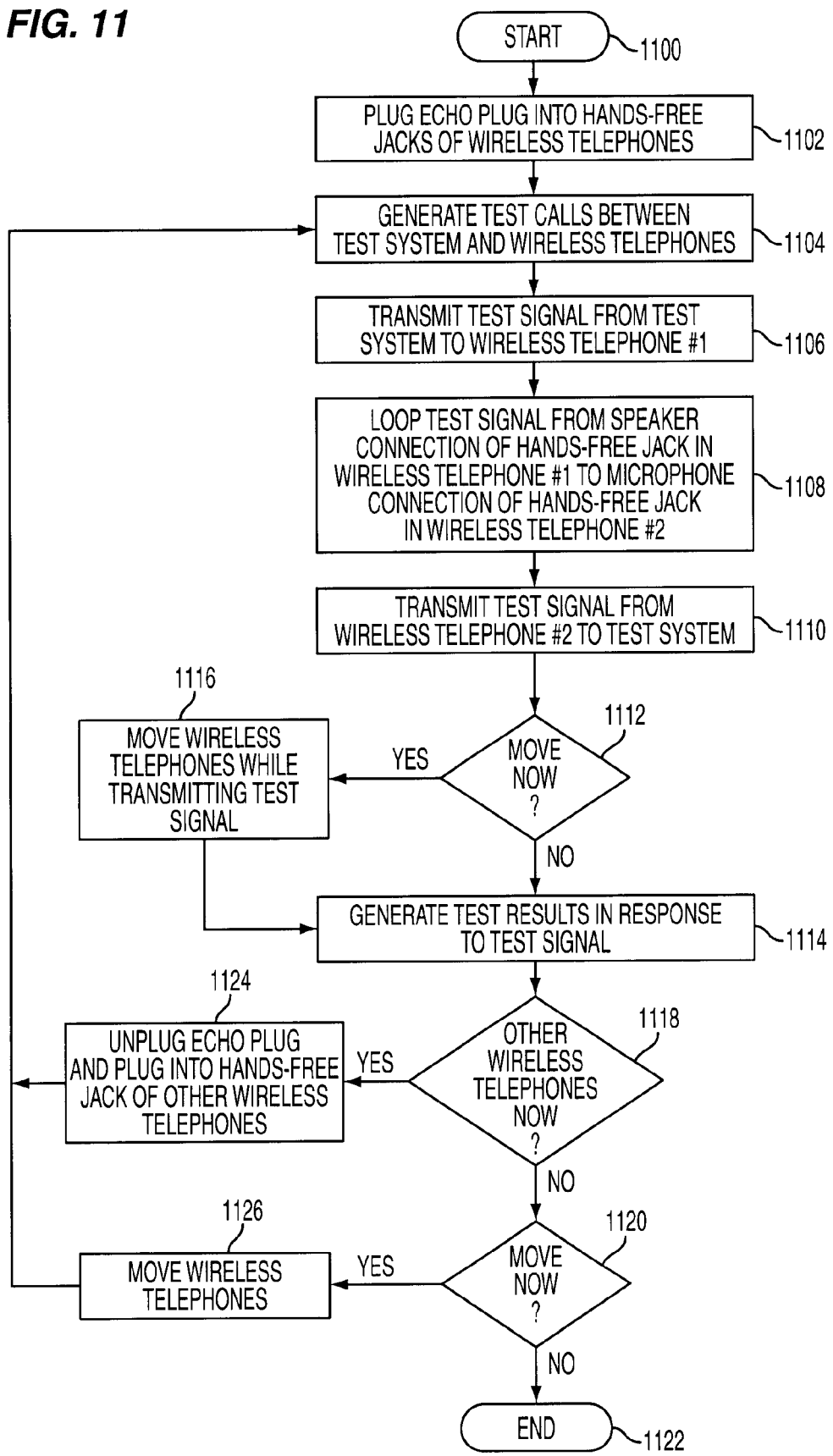
FIG. 11 is a flow diagram that illustrates a testing method in an example of the invention.

Testing Methods—FIGS. 10–11

FIG. 10 is a flow diagram that illustrates a testing method in an example of the invention for systems like that of FIG. 1. The method starts by plugging the echo plug into the hands-free jack of a wireless telephone. A test call is then generated between the test system and the wireless telephone. The test system transmits a test signal to the wireless telephone over the test call. The echo plug loops the test signal from the speaker connection of the hands-free jack to the microphone connection of the hands-free jack. The wireless telephone transmits the test signal from the microphone connection of the hands-free jack to the test system over the test call. If mobility testing is desired at this time, then the wireless telephone is moved during test signal transmission. The test system generates test results in response to the first test signal. If there is another wireless telephone to test, then the echo plug is unplugged and plugged into the hands-free jack of the other wireless telephone. The above test sequence is repeated for the other wireless telephone. If mobility testing is desired at this time, then the wireless telephones are moved to a new test location, and the test sequence is repeated.

The following is a further discuss on FIG. 10. The process starts in operation 1000. From operation 1000, the process moves to operation 1002, where the echo plug is plugged into the hands-free jack of the wireless telephone. From operation 1002, the process moves to operation 1004, where a test call is generated between the test system and the wireless telephone. From operation 1004, the process moves to operation 1006, where a test signal is transmitted from the test system to the wireless telephone. From operation 1006, the process moves to operation 1008, where the test signal is looped from the speaker connection to the microphone connection of the hands-free jack. From operation 1008, the process moves to operation 1010, where the test signal is transmitted from the wireless telephone to the test system. From operation 1010, the process moves to operation 1012, where it is determined whether mobility testing is desired. If mobility testing is not desired, the process moves to operation 1014, where test results are generated in response to the test signal. If mobility testing is desired in operation 1012, the process moves to operation 1016, where the wireless telephone is moved while transmitting the test signal. From operation 1016, the process moves to operation 1014, where test results are generated in response to the test signal. From operation 1014, the process moves to operation 1018, where it is determined whether there is another wireless telephone to test. If there is not another wireless telephone to test, the process moves to operation 1020, where it is determined whether additional mobility testing is desired. If additional mobility testing is not desired in operation 1020, the process ends at operation 1022. If there is another wireless telephone to test in operation 1018, the process moves to operation 1024, where the echo plug is unplugged and then plugged into the other wireless telephone. From operation 1024, the process returns to operation 1004. If additional mobility testing is desired in operation 1020, the process moves to operation 1026, where the wireless telephone is moved. From operation 1026, the process returns to operation 1004.

FIG. 11 is a flow diagram that illustrates an alternative testing method in an example of the invention for systems like that of FIG. 6. The method starts by plugging the echo plug into the hands-free jacks of two wireless telephones. Two test calls are then generated between the test system and the two wireless telephones. The test system transmits a test signal to the first wireless telephone over the first test call. The echo plug loops the test signal from the speaker connection of the hands-free jack in the first wireless telephone to the microphone connection of the hands-free jack in the second wireless telephone. The second wireless telephone transmits the test signal from the microphone connection of the hands-free jack to the test system over the second test call. If mobility testing is desired at this time, then the wireless telephones are moved during test signal transmission. The test system generates test results in response to the first test signal. If there are other wireless telephones to test, then the echo plug is unplugged and plugged into the hands-free jacks of the two other wireless telephones. The above test sequence is repeated for the two other wireless telephones. If mobility testing is desired at this time, then the wireless telephones are moved to a new test location, and the test sequence is repeated.

The modularity of the echo plug provides for convenient testing of many different wireless telephones. After a wireless telephone is tested, the echo plug is easily moved to another wireless telephone for another test. This procedure can be repeated for many different wireless telephones because many wireless telephones have hands-free jacks.

The following is a further discuss on FIG. 11. The process starts in operation 1100. From operation 1100, the process moves to operation 1102, where the echo plug is plugged into the hands-free jacks of the wireless telephones. From operation 1102, the process moves to operation 1104, where a test call is generated between the test system and a first wireless telephone, and another test call is generated between the test system and a second wireless telephone. From operation 1104, the process moves to operation 1106, where a test signal is transmitted from the test system to the first wireless telephone over the test call between the test system and the first wireless telephone. From operation 1106, the process moves to operation 1108, where the test signal is looped from the speaker connection of the hands-free jack of the first wireless telephone to the microphone connection of the hands-free jack of the second wireless telephone. From operation 1108, the process moves to operation 1110, where the test signal is transmitted from the second wireless telephone to the test system over the test call between the test system and the second wireless telephone. From operation 1110, the process moves to operation 1112, where it is determined whether mobility testing is desired. If mobility testing is not desired, the process moves to operation 1114, where test results are generated in response to the test signal. If mobility testing is desired in operation 1112, the process moves to operation 1116, where the wireless telephones are moved. From operation 1116, the process moves to operation 1114, where test results are generated in response to the test signal. From operation 1114, the process moves to operation 1118, where it is determined whether there are other wireless telephones to test. If there are not other wireless telephones to test, the process moves to operation 1120, where it is determined whether additional mobility testing is desired. If additional mobility testing is not desired in operation 1120, the process ends at operation 1122. If there are other wireless telephones to test in operation 1118, the process moves to operation 1124, where the echo plug is unplugged and then plugged into the other wireless telephones. From operation 1124, the process returns to operation 1104. If additional mobility testing is desired in operation 1120, the process moves to operation 1126, where the wireless telephones are moved. From operation 1126, the process returns to operation 1104.

Different communication systems can be tested by using two wireless telephones that are subscribed to the different communication systems. The test system places a first test call to the first wireless telephone over the first communication system and generates test results. The echo plug is then moved from the first wireless telephone to the second wireless telephone. The test system then places a second test call to the second wireless telephone over the second communication system and generates test results.

The mobility of the wireless telephone and echo plug provides convenient mobility testing. The wireless telephone and echo plug can be easily moved during or after the test. Mobility testing can be combined with the above testing techniques to test many different wireless telephones at many different locations over various communication systems.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of using a test system and an echo plug to test wireless telephones and a communication system through which telephone calls are made to the wireless telephones wherein a first wireless telephone has a first hands-free jack with a first connection and a first microphone connection, the method comprising:

plugging the echo plug into the first hands-free jack of the first wireless telephone;

generating a first test call between the test system and the first wireless telephone through the communication system;

transmitting a first test signal from the test system to the first wireless telephone over the first test call;

in the echo plug, looping the first test signal from the first speaker connection of the first hands-free jack to the first microphone connection of the first hands-free jack;

transmitting the first test signal from the first wireless telephone to the test system over the first test call; and generating first test results in the test system in response to the first test signal.

2. The method of claim 1 wherein a second wireless telephone has a second hands-free jack with a second speaker connection and a second microphone connection and further comprising:

unplugging the echo plug from the first hands-free jack of the first wireless telephone and plugging the echo plug into the second hands-free jack of the second wireless telephone;

generating a second test call between the test system and the second wireless telephone through the communication system;

transmitting a second test signal from the test system to the second wireless telephone over the second test call;

in the echo plug, looping the second test signal from the second speaker connection of the second hands-free jack to the second microphone connection of the second hands-free jack;

transmitting the second test signal from the second wireless telephone to the test system over the second test call; and generating second test results in the test system in response to the second test signal.

3. The method of claim 2 wherein the first test call uses a different communication system than the second test call.

4. The method of claim 1 further comprising moving the first wireless telephone and the echo plug from a first location to a second location while transmitting the first test signal.

5. The method of claim 1 further comprising:

moving the first wireless telephone and the echo plug from a first location to a second location;

generating a second test call between the test system and the first wireless telephone over the communication system;

transmitting a second test signal from the test system to the first wireless telephone over the second test call;

in the echo plug, looping the second test signal from the first speaker connection of the first hands-free jack to the first microphone connection of the first hands-free jack;

transmitting the second test signal from the first wireless telephone to the test system over the second test call; and generating second test results in the test system in response to the second test signal.

6. The method of claim 1 further comprising attenuating the first test signal in the echo plug.

7. The method of claim 1 further comprising delaying the first test signal in the echo plug.

8. The method of claim 1 further comprising canceling side-tones from the first test signal in the echo plug.

9. The method of claim 1 wherein generating the first test results comprises generating voice quality statistics.

10. The method of claim 1 wherein generating the first test results comprises generating round-trip delay statistics.

11. A method of using a test system and an echo plug to test wireless telephones and a communication system through which telephone calls are made to the wireless telephones wherein a first wireless telephone has a first hands-free jack with a first speaker connection and a second wireless telephone has a second hands-free jack with a first microphone connection, the method comprising:

plugging the echo plug into the first hands-free jack of the first wireless telephone and into the second hands-free jack of the second wireless telephone;

generating a first test call between the test system and the first wireless telephone through the communication system and generating a second test call between the test system and the second wireless telephone through the communication system;

transmitting a first test signal from the test system to the first wireless telephone over the first test call;

in the echo plug, looping the first test signal from the first speaker connection of the first hands-free jack to the first microphone connection of the second hands-free jack;

transmitting the first test signal from the second wireless telephone to the test system over the second test call; and generating first test results in the test system in response to the first test signal.

12. The method of claim 11 wherein a third wireless telephone has a third hands-free jack with a second speaker connection and a fourth wireless telephone has a fourth hands-free jack with a second microphone connection and further comprising:

unplugging the echo plug from the first hands-free jack of the first wireless telephone and from the second hands-free jack of the second wireless telephone and plugging the echo plug into the third hands-free jack of the third wireless telephone and into the fourth hands-free jack of the fourth wireless telephone;

generating a third test call between the test system and the third wireless telephone through the communication system and generating a fourth test call between the test system and the fourth wireless telephone through the communication system;

transmitting a second test signal from the test system to the third wireless telephone over the third test call;

in the echo plug, looping the second test signal from the second speaker connection of the third hands-free jack to the second microphone connection of the fourth hands-free jack;

transmitting the second test signal from the fourth wireless telephone to the test system over the fourth test call; and generating second test results in the test system in response to the second test signal.

13. The method of claim 12 wherein the first test call and the third test call use a different communication system than the second test call and the fourth test call.

14. The method of claim 11 further comprising moving the first wireless telephone, the second wireless telephone, and the echo plug from a first location to a second location while transmitting the first test signal.

15. The method of claim 11 further comprising:
moving the first wireless telephone, the second wireless telephone, and the echo plug from a first location to a second location;
generating a third test call between the test system to the first wireless telephone through the communication system and generating a fourth test call between the test system and the second wireless telephone through the communication system;
transmitting a second test signal from the test system to the first wireless telephone over the third test call;
in the echo plug, looping the second test signal from the first speaker connection of the first hands-free jack to the first microphone connection of the second hands-free jack;
transmitting the second test signal from the second wireless telephone to the test system over the fourth test call; and
generating second test results in the test system in response to the second test signal.

16. The method of claim 11 further comprising attenuating the first test signal in the echo plug.

17. The method of claim 11 wherein generating the first test results comprises generating voice quality statistics.

18. The method of claim 11 wherein generating the first test results comprises generating round-trip delay statistics.

19. A method comprising:
looping back a test signal from an audio output of a wireless telephone to an audio input of the wireless telephone, the test signal having been transmitted to the wireless telephone over a test call between a test system and the wireless telephone through a communication system through which telephone calls are made to the wireless telephone; and
transmitting the looped-back test signal from the wireless telephone to the test system over the test call.

20. A method as in claim 19, further comprising:
generating test results by the test system in accordance with the looped-back test signal transmitted to the test system.

21. A method as in claim 19, further comprising:
during said looping back, attenuating the test signal.

22. A method as in claim 19, further comprising:
during said looping back, delaying the test signal.

23. A method as in claim 19, further comprising:
during said looping back, canceling side-tones in the test signal.

24. A method comprising:
generating a test call between a test system and a wireless telephone through a communication system through which telephone calls are made to the wireless telephone, the wireless telephone having an audio input and an audio output;
transmitting a test signal from the test system to the wireless telephone over the test call;
looping back the test signal from the audio output of the wireless telephone to the audio input of the wireless telephone;
transmitting the looped-back test signal from the wireless telephone to the test system through the communication system over the test call; and generating test results by the test system in accordance with the looped-back test signal transmitted to the test system.

25. An apparatus comprising:
means for looping back a test signal from an audio output of a wireless telephone to an audio input of the wireless telephone, the test signal having been transmitted to the wireless telephone over a test call between a test system and the wireless telephone through a communication system through which telephone calls are made to the wireless telephone; and
means for transmitting the looped-back test signal from the wireless telephone to the test system over the test call.

26. A method comprising:
looping back a test signal from an audio output of a first wireless telephone to an audio input of a second wireless telephone, the test signal having been transmitted to the first wireless telephone over a test call between a test system and the first wireless telephone through a communication system through which telephone calls are made to wireless telephones; and
transmitting the looped-back test signal from the second wireless telephone to the test system over a test call between the test system and the second wireless telephone through the communication system.

27. A method as in claim 26, further comprising:
generating test results by the test system in accordance with the looped-back test signal transmitted to the test system.

28. An apparatus comprising:
means for looping back a test signal from an audio output of a first wireless telephone to an audio input of a second wireless telephone, the test signal having been transmitted to the first wireless telephone over a test call between a test system and the first wireless telephone through a communication system through which telephone calls are made to wireless telephones; and
means for transmitting the looped-back test signal from the second wireless telephone to the test system over a test call between the test system and the second wireless telephone through the communication system.

29. A method comprising:
generating a first test call between a test system and a first wireless telephone through a communication system through which telephone calls are made to wireless telephones, the first wireless telephone having an audio output;
generating a second test call between the test system and a second wireless telephone through the communication system, the second wireless telephone having an audio input;
transmitting a test signal from the test system to the first wireless telephone over the first test call;
looping back the test signal from the audio output of the first wireless telephone to the audio input of the second wireless telephone;
transmitting the looped-back test signal from the second wireless telephone to the test system through the communication system over the second test call; and
generating test results by the test system in accordance with the looped-back test signal transmitted to the test system.

* * * * *